United States Patent [19]

Wheelock

[11] Patent Number: 4,499,195

[45] Date of Patent: Feb. 12, 1985

[54] THERMALLY STABLE MIXED OXIDE GELS

[75] Inventor: Kenneth S. Wheelock, Baton Rouge, La.

[73] Assignee: Exxon Research & Engineering Co., Florham Park, N.J.

[21] Appl. No.: 452,839

[22] Filed: Dec. 23, 1982

[51] Int. Cl.$^3$ ............................................. B01J 21/16
[52] U.S. Cl. ...................... 502/63; 502/405; 502/84; 208/120
[58] Field of Search ............ 252/455 R, 461; 502/84, 502/405, 63

[56] References Cited

U.S. PATENT DOCUMENTS

| | | | |
|---|---|---|---|
| 3,034,994 | 5/1982 | Braithwaite et al. | 252/453 |
| 3,092,457 | 6/1963 | Sprague | 423/612 |
| 3,642,659 | 2/1972 | Dorn et al. | 252/435 |
| 3,752,773 | 8/1973 | Duke, Jr. et al. | 252/454 |
| 3,791,963 | 2/1974 | Jaffe | 208/111 |
| 3,957,527 | 5/1976 | Torok et al. | 502/84 |
| 4,022,714 | 5/1977 | Elliott, Jr. | 252/455 R |
| 4,075,126 | 2/1978 | Stridde | 502/84 |
| 4,098,676 | 7/1978 | Robson | 208/111 |
| 4,111,846 | 9/1978 | Elliott, Jr. | 252/455 Z |
| 4,113,660 | 9/1978 | Abe et al. | 252/455 R |
| 4,140,654 | 2/1979 | Yoshioka et al. | 252/440 |
| 4,176,090 | 11/1979 | Vaughan et al. | 252/455 Z |
| 4,216,188 | 8/1980 | Shabrai et al. | 252/455 R |
| 4,226,743 | 10/1980 | Seese et al. | 252/453 |
| 4,271,043 | 6/1981 | Vaughan et al. | 252/455 R |
| 4,273,724 | 6/1981 | Kugler et al. | 252/455 R |
| 4,277,539 | 7/1981 | Keller et al. | 428/450 |

*Primary Examiner*—Delbert E. Gantz
*Assistant Examiner*—O. Chaudhuri
*Attorney, Agent, or Firm*—Llewellyn A. Proctor

[57] ABSTRACT

A process for cogelling a smectite with an inorganic metal oxide which is unstable with respect to retaining a high surface area, to produce a cogel of high surface area which has good retention of surface area at high temperatures. Suitable smectites for the practice of this invention are hectorite, chlorite, montmorillionite, beidellite, or admixtures of two or more of these materials with each other or with other materials, or the like. Exemplary of inorganic oxide gels suitable for the practice of this invention are the Group IV-B metal oxides, especially titanium oxide, and other metal oxides such as the oxides of thorium, uranium, silicon, aluminum, and the like.

7 Claims, No Drawings

THERMALLY STABLE MIXED OXIDE GELS

FIELD OF THE INVENTION

This invention relates to the preparation of thermally stable, high surface area inorganic oxide gels. In particular, it relates to the thermal stabilization and formation of mixed titanium oxide gels, or cogels.

BACKGROUND OF THE INVENTION AND PRIOR ART

Inorganic oxide gels have been known and used for many years for varius purposes, e.g., as adsorbents, catalyst supports, and catalysts. Few of these gels, in the relative sense, however, have been used as catalyst supports because only a handful have sufficient surface area and adequate pore volume, particularly at present-day process conditions. Thus alumina ($Al_2O_3$), silica ($SiO_2$), silica-alumina ($SiO_2$-$Al_2O_3$), and crystalline silica-alumina ($SiO_2$-$Al_2O_3$) such as the zeolites, represent the preponderance of the inorganic oxide gels which have been commercially used as catalyst supports, or catalysts in the petroleum, chemical and related industries. These inorganic oxide gels, which are the exceptions among the inorganic oxide gels, can be prepared in forms which have high surface area and adequate pore volume, and they are stable in most environments at high temperatures. Most other inorganic oxide gels, even if they can be prepared in form having adequate high surface area and pore volume, are not stable at high temperatures. For example, titanium oxide ($TiO_2$) can be prepared in high surface area form, but at normal hydrocarbon processing temperatures, i.e., about 750° F. to about 930° F., and higher, titanium oxide loses its surface area. Consequentially, titanium oxide is unsuitable as a catalyst carrier or catalyst at normal hydrocarbon processing conditions.

The preparation of titanium oxide gels is disclosed, e.g., in U.S. Pat. Nos. 2,682,242; 2,553,402; 2,584,286; and 3,092,457. Particular reference is made to this latter reference, i.e., U.S. Pat. No. 3,092,457, which issued June 4, 1968, to James W. Sprague. This patent discloses the preparation of a titania gel of good purity with reasonably high surface area. In accordance with the Sprague patent, titanium isopropoxide was acetolyzed with glacial acetic acid, and the resulting solution then hydrolyzed with water to form a clear sol which gelled overnight. The hydrolyzed gel was then dried, calcined and the gel ground to a small particle size to provide particles of surface area ranging from 75 to 125 $m^2/g$.

Certain classes of expandable clay minerals, or smectites have been used as adsorbents, but very little has been reported in the literature regarding the use of these materials as catalysts. The adsorption of aromatics such as benzene and phenol from aqueous solution on smectites such as montmorillionite has been reported but these materials also lack thermal stability. Most of the literature in the last few years has dealt mainly with the preparation and physical properties of these materials. However, two recent publications by J. Shabtai et al., viz. J. Shabtai, R. Lazar & A. Obead—*Tokyo Catalysis Congress* 1980 Preprints, and J. Shabtai, R. Lazar & N. Frydman—*J. Chem. Soc.* 1977 pg. 660, do disclose the catalytic activity of montmorillionites in cracking and esterification reactions. A hydrogenation catalyst is reported by T. Pinnavaia using hectorite. Reference is made to W. Quayle & T. J. Pinnavaia, *Inorg. Chem.* 18, 10, 2840, 1979. Stable pillared interlayered clay compositions which possess considerable micropore volume and have useful adsorbent and catalytic properties are prepared, as described in U.S. Pat. No. 4,176,090 by reacting smectite type clays with polymeric cationic hydroxy metal complexes of metals such as aluminum, zirconium, and/or titanium. The use of smectites as catalysts, however, is quite limited due to their low surface area and their insufficient thermal stability in high-temperature processes.

It is accordingly a primary objective of the present invention to obviate these and other prior art deficiencies and, in particular, to provide the art with a method of making new and improved oxide catalyst supports or catalysts having improved surface area, particularly titania oxide catalyst supports or titania oxide catalysts which significantly retain their surface area at relatively high temperatures.

A specific object is to provide a new and improved process for the preparation of a titanium oxide cogel with relatively high surface area which can be thermally activated at relatively high temperatures without significant loss of surface area, the titanium oxide cogel being suitable as a catalyst support or catalyst for use in high temperature hydrocarbon conversion reactions.

These objects and others are achieved in accordance with the present invention embodying a process for cogelling a smectite with a Group IV-B metal oxide of the Periodic Table of the Elements (E. H. Sargent & Co., Copyright 1962 Dyna-Slide Co.), e.g., titanium oxide, zirconium oxide, hafnium oxide, and the like; and other metal oxides such as an oxide of thorium, uranium, silicon, aluminum, and the like; particularly an inorganic metal oxide which is unstable with respect to retaining a high surface area, to produce a cogel of high surface area which has good retention of surface area at high temperatures. Suitable smectites for the practice of this invention are hectorite, chlorite, montmorillionite, beidellite, or admixtures of two or more of these materials with each other or with other materials, or the like.

In a preferred embodiment, a titanium dioxide gel is stabilized against thermal desurfacing by cogelling said titanium dioxide gel with a smectite. The resultant cogel is one having a surface area higher than the original titanium oxide gel, or smectite, and the cogel has good surface area retention at high temperatures such as is required in processing hydrocarbons. A titania gel is first prepared by the acetolysis of an organo-, or hydrocarbyl titanium compound, or salt, by a conventional method as disclosed in U.S. Pat. No. 3,092,457, supra, herewith incorporated by reference. An organo-, or hydrocarbyl titanium compound, suitably an organic ester of titanic acid, e.g., tetraisopropyl titanate, is reacted with glacial acetic acid in solution, suitably e.g., an alcohol/water solution, and reaction continued until acetolysis is complete. To this solution, after completion of acetolysis, is then added the smectite gel, and water, suitably as an aqueous solution of the smectite gel, to hydrolyze the reaction product resultant from the acetotysis. On setting, a cogel of the titanium oxide gel and smectite is formed. The cogel is separated from the solution, dried and calcined. The composition which is produced possesses a greater surface area than either of its components as inorganic oxides, and has a greater thermal stability toward loss of surface area. The resultant composition is useful for effecting catalytic conversions either alone or when supported on a carrier, and with or without the additional presence of other catalytically active components composited therewith or dispersed thereon as supported metals.

The invention will be more fully understood by reference to the following examples, and demonstrations, which illustrate its more salient features. All terms are given in terms of weight except as otherwise specified.

EXAMPLES (I) In accordance with the teachings of U.S. Pat. No. 3,092,457, supra, 274.5 g. of titanium isopropoxide was acetolyzed with 250 cc of glacial acetic acid. Instead of hydrolyzing with water as taught by Sprague, 80.0 g. of Bentonite (Curtin technical grade) was dispersed in 500 cc deionized water to which 300 g. of $H_2O$ (ice) was added. When the ice was melted, the Bentonite gel was added to the titanium containing solution with a high rate of stirring to facilitate co-gel formation. An additional 1000 cc of water was added to the gel to facilitate stirring.

This procedure was repeated reversing the order of addition, that is instead of adding the water to the titanium oxide precursor, the titanium oxide precursor was added to the aqueous gel. This procedure is referred to as reverse addition whereas the former is referred to as forward addition.

For purposes of comparison, a $TiO_2$ gel was prepared by a conventional method as also disclosed in U.S. Pat. No. 3,092,457.

All of the gels were calcined for at least 4 hours at 400° C. to remove water and to establish the gel structure. In addition, the Bentonite was also calcined for 4 hours at 400° C. for purposes of comparison. Samples of all the materials so prepared were then calcined for an additional 4 hours at various temperatures ranging from 400°–550° C. The surface areas of the materials calcined at various temperatures were determined by the B.E.T. method, and are presented in Table I.

TABLE I

| Gel Surface Areas (B.E.T. $m^2/g$) | | | | | |
|---|---|---|---|---|---|
| Calcination Temperatures, °C. | | | | Gel | |
| 1st 4 Hrs. | 2nd 4 Hrs. | Bentonite | $TiO_2$ | Bentonite/$TiO_2$ (forward addition) | Bentonite/$TiO_2$ (reverse addition) |
| 400 | — | 43.1 | 97.7 | 202.6 | 185.7 |
| 400 | 400 | 45.2 | 97.9 | 204.0 | 191.6 |
| 400 | 450 | 40.6 | 85.0 | 215.8 | 179.3 |
| 400 | 500 | 40.5 | 75.6 | 204.3 | 188.8 |
| 400 | 550 | 44.5 | 62.3 | 210.1 | 164.1 |

The data in Table I clearly show that for the Bentonite-$TiO_2$ gels, a higher surface area results from the co-gel than can be expected from the surface areas of the components, and that the surface area of the co-gel is much more stable with respect to thermal desurfacing than the parent $TiO_2$ gel. In addition, the data also show that forward addition is preferred to reverse addition in terms of creating more surface area in the gel, although both techniques improve the thermal stability. For the case of forward addition, there is no loss of surface area with increasing calcination temperature. For the case of reverse addition, the surface area loss on calcination is much less than would be expected on the basis of simple ratios. Reference is made to Table II.

TABLE II

| Expected Surface Areas of Co-Gels (B.E.T. $m^2/g$) | | | | | | |
|---|---|---|---|---|---|---|
| Calcination Temp., °C. | | | Gel | | | |
| | | | Bentonite/$TiO_2$ (forward addition) | | Bentonite/$TiO_2$ (reverse addition) | |
| 1st 4 Hrs. | 2nd 4 Hrs. | $TiO_2$ Actual | Actual | Expected | Actual | Expected |
| 400 | 400 | 97.9 | 204.0 | — | 191.6 | — |
| 400 | 450 | 85.0 | 215.8 | 177.1 | 179.3 | 166.4 |
| 400 | 500 | 75.6 | 204.3 | 157.5 | 188.8 | 148.0 |
| 400 | 550 | 62.3 | 210.1 | 129.8 | 164.1 | 121.9 |

A simple physical mixture of Bentonite and $TiO_2$ gel gives surface areas varying between the limits set by the pure or unmixed components. The quantities used in the preparation of the two Bentonite/$TiO_2$ co-gels would give weights corresponding to a physical mixture of 80 g. Bentonite and 80 g. $TiO_2$. Using surface areas of 45.2 $m^2/g$ for the Bentonite and 97.9 $m^2/g$ for the $TiO_2$ gel and the weight ratio of the mixture used in the preparations, i.e., $$\frac{80(45.2) + 80(87.9)}{80 + 80} = 71.55$$

a surface area of 71.55 $m^2/g$ would be expected for the co-gel. Instead, depending on the order of addition, surface areas of 204.0 and 191.6 $m^2/g$ were obtained at the same calcination conditions. Reference is made to Table 3.

TABLE III

| Surface Areas of Physical Mixtures vs. Co-Gels (B.E.T. $m^2/g$) | | | | | | | |
|---|---|---|---|---|---|---|---|
| Calcination Temperature, °C. | | | | Gel | | | |
| 1st 4 Hrs. | 2nd 4 Hrs. | Bentonite | $TiO_2$ | Bentonite/$TiO_2$ (forward addition) | | Bentonite/$TiO_2$ (reverse addition) | |
| | | | | Co-Gel | Mixture | Co-Gel | Mixture |
| 400 | 400 | 45.2 | 97.9 | 204.0 | 71.6 | 191.6 | 71.6 |
| 400 | 450 | 40.6 | 85.0 | 215.8 | 62.8 | 179.3 | 62.8 |
| 400 | 500 | 40.5 | 75.6 | 204.3 | 58.05 | 188.8 | 58.05 |
| 400 | 550 | 44.5 | 62.3 | 210.1 | 53.4 | 164.1 | 53.4 |

The co-gels thus possess more than twice the surface area of that to be expected on the basis of simple physical mixtures.

The following data show that the titanium dioxide-bentonite cogel compositions possess catalytic cracking activity, to wit:

(II) 8.70 gms of titanium dioxide-bentonite cogel 1:1 by weight which had been calcined for four hours at 400° C. and recalcined for four hours at 550° C. was weighed out. Ceric ammonium nitrate in an amount of 0.69 gms was weighed out and dissolved in 5 cc of deionized water. This solution was added to the cogel by the method of incipient wetness. The preparation was dried in vacuo at 86° C. for three hours, subsequently calcined at 400° C. for two and one-half hours, and the catalyst then tested for catalytic cracking activity in a micro-activity test (MAT) essentially similar to ASTM D3907-80. Conversion obtained was 35.1 volume percent, and the hydrogen yield was 0.8878 weight percent based on feed.

(III) To 50.06 gms of the cogel described in II was added 18.33 cc of deionized water solution which contained 0.83 gm of ammonium hydrofluoride, $NH_4Hf_2$, by the method of incipient wetness. After drying, the catalyst was calcined at 500° C. for five hours. This catalyst was also given a micro activity test for catalytic cracking activity. Conversion obtained was 38.2 volume percent and the hydrogen yield was 0.5342 weight percent on feed.

Having described the invention, what is claimed is:

1. A process for the preparation of an oxide co-gel of high surface area suitable for use as a catalyst support or catalyst at elevated temperatures without significant loss of surface area which comprises forming a co-gel consisting of a smectite and an oxide selected from titanium oxide, zirconium oxide, hafnium oxide, thorium oxide, uranium oxide, silicon oxide, and aluminum oxide.

2. A process for the preparation of a titanium oxide cogel of high surface area suitable for use as a catalyst support or catalyst at elevated tempertures without significant loss of surface area which comprises forming a co-gel consisting of a smectite and a titanium oxide.

3. The process of claim 2 wherein a titanium oxide gel is prepared by the acetolysis of a hydrocarbyl titanium compound in solution, to which water and the smectite as a gel are added to hydrolyze the reaction product and form a titanium oxide cogel.

4. The process of claim 2 wherein the smectite is hectorite, chlorite, montmorillionite, beidellite, or admixtures thereof.

5. As a composition of matter, a co-gel consisting of a smectite and titanium oxide.

6. The composition of claim 5 wherein the smectite is hectorite, chlorite, montmorillionite, beidellite, or admixture thereof.

7. As a composition of matter, a co-gel which consists of a smectite and an oxide selected from titanium oxide, zirconium oxide, hafnium oxide, thorium oxide, uranium oxide, silicon oxide and aluminum oxide.

* * * * *